United States Patent
Stockinger et al.

(10) Patent No.: US 11,524,594 B2
(45) Date of Patent: Dec. 13, 2022

(54) CONTACT SYSTEM FOR ESTABLISHING AN ELECTRIC CONNECTION BETWEEN A VEHICLE AND A POWER SUPPLY

(71) Applicant: Easelink GmbH, Graz (AT)

(72) Inventors: Hermann Stockinger, Graz (AT); Manuel Leibetseder, Graz (AT)

(73) Assignee: EASELINK GMBH, Graz (AT)

( * ) Notice: Subject to any disclaimer, the term of this patent is extended or adjusted under 35 U.S.C. 154(b) by 968 days.

(21) Appl. No.: 16/087,707

(22) PCT Filed: Mar. 16, 2017

(86) PCT No.: PCT/AT2017/060070
§ 371 (c)(1),
(2) Date: Sep. 24, 2018

(87) PCT Pub. No.: WO2017/161395
PCT Pub. Date: Sep. 28, 2017

(65) Prior Publication Data
US 2020/0254891 A1    Aug. 13, 2020

(30) Foreign Application Priority Data
Mar. 25, 2016 (AT) .............................. A 50250/2016

(51) Int. Cl.
*B60L 53/35* (2019.01)
*H01R 13/22* (2006.01)
(Continued)

(52) U.S. Cl.
CPC .............. *B60L 53/35* (2019.02); *B60L 53/14* (2019.02); *B60L 53/16* (2019.02); *H01R 13/22* (2013.01);
(Continued)

(58) Field of Classification Search
CPC .......... B60L 53/35; B60L 53/14; H01R 13/22
(Continued)

(56) References Cited

U.S. PATENT DOCUMENTS 6,307,347 B1    10/2001 Ronning
9,862,282 B2    1/2018 Böser et al.
(Continued)

FOREIGN PATENT DOCUMENTS

CN    104870243 A    8/2015
DE    10137526 A1    6/2002
(Continued)

OTHER PUBLICATIONS

PCT International Search Report and Written Opinion dated Jun. 22, 2017 from corresponding Application No. PCT/AT2017/060070, 12 pages.

*Primary Examiner* — Suchin Parihar
(74) *Attorney, Agent, or Firm* — Dilworth IP, LLC

(57) ABSTRACT

The invention relates to a contact system for establishing an electric connection between a vehicle and a power supply having a first pole and a second pole for charging the vehicle, secondary contact surfaces being mounted such that they surround a second insulating surface, wherein the second insulating surface has at least one minimum width which is greater than the peripheral size of one of the contacted primary contact surfaces in the same direction (X, Y, Z).

13 Claims, 3 Drawing Sheets

(51) Int. Cl.
  *H01R 13/62* (2006.01)
  *B60L 53/14* (2019.01)
  *B60L 53/16* (2019.01)
  *H01R 13/44* (2006.01)
(52) U.S. Cl.
  CPC ............. *H01R 13/44* (2013.01); *H01R 13/62* (2013.01); *H01R 2201/26* (2013.01)
(58) Field of Classification Search
  USPC ........................................................ 320/109
  See application file for complete search history.

(56) References Cited

U.S. PATENT DOCUMENTS

| | | | |
|---|---|---|---|
| 2009/0011616 A1 | 1/2009 | Patwardhan | |
| 2012/0112552 A1* | 5/2012 | Baarman | H01F 38/14 |
| | | | 307/104 |
| 2015/0236513 A1* | 8/2015 | Covic | H02J 50/10 |
| | | | 307/104 |
| 2015/0367739 A1 | 12/2015 | Böser et al. | |
| 2017/0313203 A1* | 11/2017 | Amari | B60L 53/37 |
| 2017/0361724 A1* | 12/2017 | Seong | B60L 53/37 |
| 2017/0368944 A1* | 12/2017 | Huang | B60L 53/122 |
| 2018/0015836 A1* | 1/2018 | Madon | B60L 53/65 |
| 2020/0406767 A1* | 12/2020 | Booth | B60L 53/36 |

FOREIGN PATENT DOCUMENTS

| | | |
|---|---|---|
| DE | 102014216568 A1 | 2/2016 |
| JP | H066904 A | 1/1994 |
| JP | H0817538 A | 1/1996 |
| JP | 2003197277 A | 7/2003 |
| JP | 2014150642 A | 8/2014 |
| WO | 2010/060720 A2 | 6/2010 |
| WO | 2010/076976 A2 | 7/2010 |
| WO | 2011063959 A1 | 6/2011 |

* cited by examiner

CONTACT SYSTEM FOR ESTABLISHING AN ELECTRIC CONNECTION BETWEEN A VEHICLE AND A POWER SUPPLY

The invention relates to a contacting system for establishing an electrical connection between a vehicle and a power supply with a first terminal and a second terminal for charging the vehicle, with:

a primary transmission element which has a plurality of primary contact surfaces arranged in a structured manner, electrically insulated from each other and each having an outer contour, and with a secondary transmission element which has at least one first secondary contact surface, for contacting the first terminal, and at least one second secondary contact surface, for contacting the second terminal, wherein the secondary contact surfaces are electrically insulated from each other, and with control means which are designed in order to determine first primary contact surfaces which are in contact with the first secondary contact surface and which are designed to determine second primary contact surfaces which are in contact with the second secondary contact surface, and which are designed to establish an electrical connection via the first primary contact surfaces and the first secondary contact surface for supplying energy to the vehicle and which are designed to establish an electrical connection via the second primary contact surfaces and the second secondary contact surface between the second terminal of the power supply and the second terminal of the vehicle.

BACKGROUND OF THE INVENTION

Such a contacting system is known, for example, from the document U.S. Pat. No. 8,307,967 B2, which discloses a vehicle with a secondary transmission element and a primary transmission element embedded in the road surface of a parking space. When the vehicle, driven by an electric motor, is parked in the parking space, a mechanism then lowers the secondary transmission element onto the primary transmission element, whereby electric current can flow in order to charge the vehicle's power supply via contact surfaces of the transmission elements.

The primary transmission element embedded in the road surface of the parking space is formed by two rows of round primary contact surfaces, electrically insulated from each other, arranged in the shape of a rectangle or grid. Control means are assigned to the primary transmission element, which means are connected, on the one hand, to each of the primary contact surfaces and, on the other hand, to a positive terminal and a negative terminal of a low-voltage power source in the range of from 12 to 24 volts. By means of the control means, each of the primary contact surfaces, which are for the time being switched potential-free, can be connected to the positive terminal or to the negative terminal.

The secondary transmission element on the vehicle disclosed in U.S. Pat. No. 8,307,967 B2 has a row of square secondary contact surfaces, wherein the sizes of the contact surfaces have been selected such that no short circuits of the contact surfaces of a transmission element can result through contact surfaces of the other transmission element. After the mechanical lowering of the secondary transmission element onto the primary transmission element, the control means determine which primary and secondary contact surfaces are in electrical contact and then connect the appropriate primary contact surfaces of the primary transmission element to the positive terminal, and the appropriate secondary contact surfaces of the secondary transmission element to the negative terminal of the low-voltage source, so that the vehicle's power supply is charged.

In the case of the known contacting system, it has proved to be disadvantageous that, with the low-voltage source, the charging processes last a relatively long time which is why, in the case of a parking duration of, for example, only an hour, the vehicle's power supply is not completely charged. For safety reasons, the use of voltages lying above the low-voltage range between positive terminal and negative terminal is not feasible, as otherwise electrifications can result if for example a person reaches under the vehicle and onto the contact surfaces during the charging process.

SUMMARY OF THE INVENTION

The invention is based on the object of creating a contacting system in which the charging duration for the complete charging of the power supply in the vehicle can be reduced, wherein at the same time the required safety must be guaranteed. According to the invention, the present object is achieved by a contacting system in which a second insulating surface surrounding the secondary contact surfaces is provided, which has at least one optionally direction-dependent minimum width which is greater than the extent of the contour of one of the contacted primary contact surfaces in the same direction.

It is hereby ensured that primary contact surfaces, which are switched from the potential-free state by the control means and are connected to the positive terminal or the negative terminal because they are in electrical contact with secondary contact surfaces, are reliably covered by the second insulating surface. The advantage is hereby obtained that there is no risk that a person can touch a contact surface connected to the positive terminal or the negative terminal, for example with a finger. As this is ensured, voltage sources with voltages of 60 volts or more between the positive terminal and the negative terminal of the primary contact surfaces may also be applied, whereby the vehicle's power supply can be charged with higher currents for a shorter charging time.

The outer contour of the primary contact surfaces can be direction-independent, as in the case of, for example, circular primary contact surfaces. However, the outer contour of the primary contact surfaces can also be direction-dependent, as in the case of, for example, a hexagonal or oval contour of the primary contact surfaces.

The width of the second insulating surface, for shielding live terminals against being touched by people, may be selected such that it is always sufficiently wide both for a direction-independent and for a direction-dependent contour of the primary contact surface. According to the invention, this is achieved when the width of the second insulating surface is selected wider than the circumference around the largest outer contour of the primary contact surfaces. The advantage is hereby obtained that the secondary transmission element can be lowered onto the first transmission element in a direction-independent manner for the contacting.

According to another embodiment of the invention, the width of the second insulating surface can, however, also be selected in a direction-dependent manner such that it is just slightly wider than the width of the contacted primary contact surface in the same direction. In this case, however, positioning means have to be provided which ensure that the secondary transmission element is lowered onto the primary transmission element aligned therewith for the contacting.

The advantage is hereby obtained that the secondary transmission element can be designed particularly small, which facilitates integration thereof into the vehicle.

Further advantageous embodiments of the contacting system according to the invention for establishing an electrical connection between a vehicle and a power supply for charging the vehicle are explained in more detail in the following with reference to the figures.

DETAILED DESCRIPTION OF THE INVENTION

Figure 1:
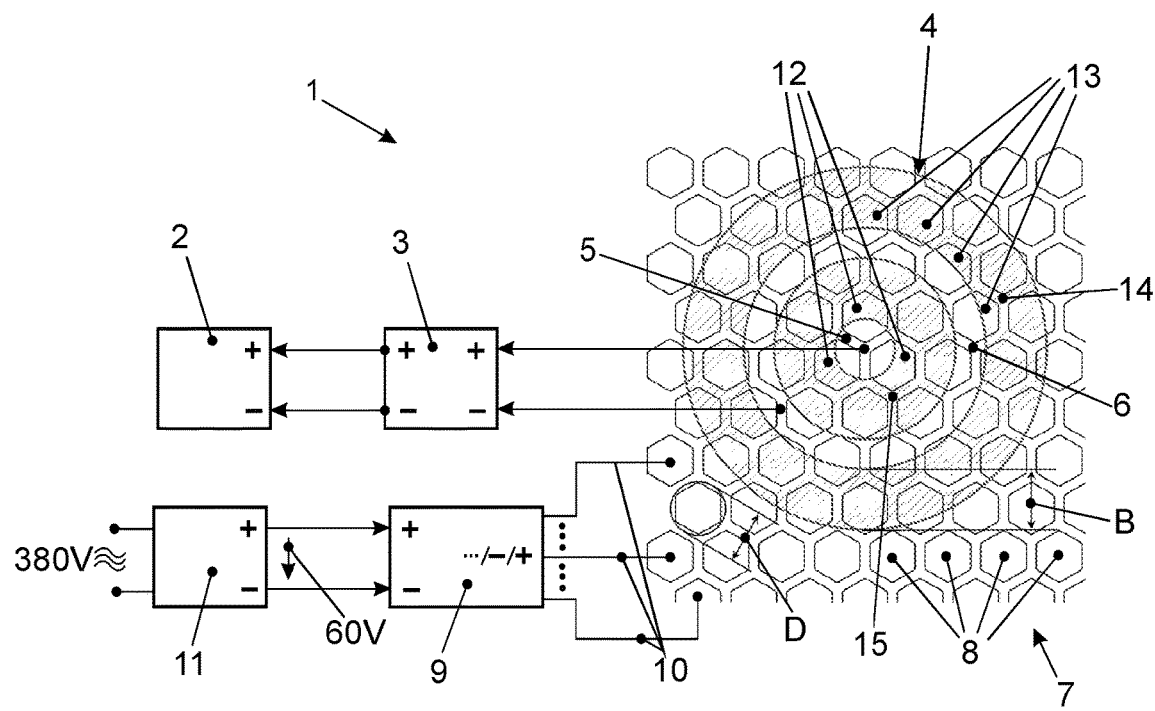
FIG. 1 shows a first embodiment of the contacting system according to the invention, in which a second secondary contact surface completely surrounds a first secondary contact surface of the secondary transmission element.
Figures 2A, 2B:
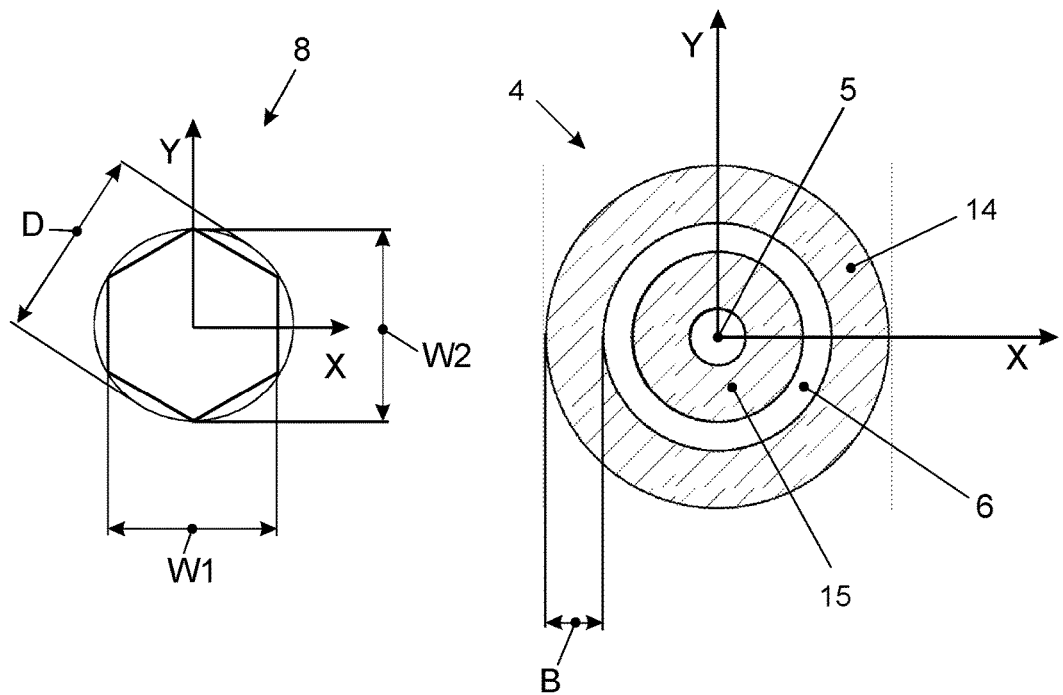
FIG. 2A shows a primary contact surface of the primary transmission element according to FIG. 1 in an enlarged representation.
FIG. 2B shows the secondary contact surfaces of the secondary transmission element according to FIG. 1.
Figure 3:
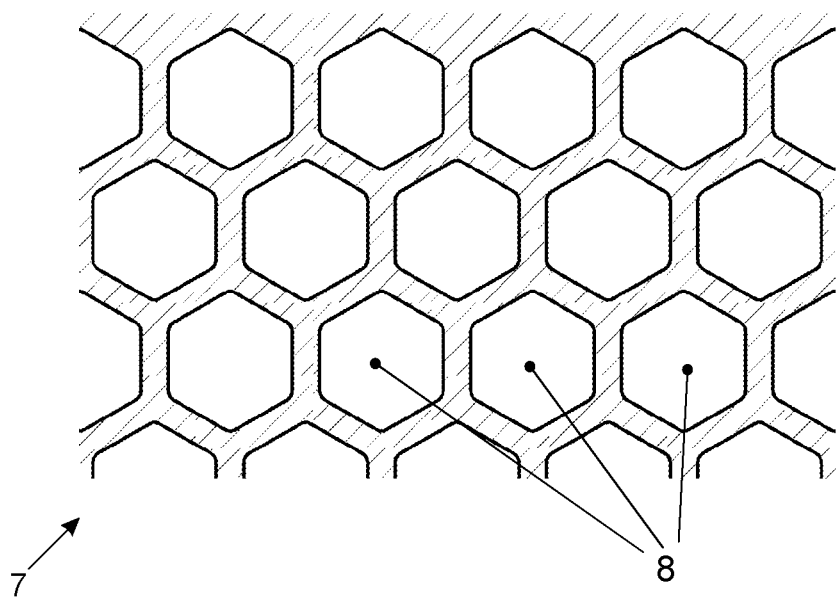
FIG. 3 shows the primary contact surfaces of the primary transmission element arranged in the shape of a grid according to FIG. 1.

FIGS. 1 to 3 show a first embodiment of a contacting system 1 for establishing an electrical connection between a vehicle and a power supply with a positive terminal and a negative terminal for charging the vehicle. Of the vehicle, only a battery 2, a charging circuitry 3 and a secondary transmission element 4 are shown, through which power is supplied to the vehicle for charging the battery 2. In FIG. 2B, a first secondary contact surface 5, which is connected via the charging circuitry 3 to the positive terminal of the battery 2, and a second secondary contact surface 6, which is connected via the charging circuitry 3 to the negative terminal of the battery 2, of the secondary transmission element 4 are shown.

The contacting system 1 furthermore has a primary transmission element 7 embedded in or fitted on the road surface of a parking space, shown in FIG. 3, which has a plurality of primary contact surfaces 8 with a uniform hexagonal outer contour arranged in a structured manner, and in particular in the shape of a grid, electrically insulated from each other. A circumference with a diameter D determines the outer contour of the primary contact surfaces 8.

The contacting system 1 furthermore has control means 9 which are connected to each of the primary contact surfaces 8. For the sake of better clarity, only a few of these connecting lines 10 are represented in FIG. 1. The control means 9 are furthermore connected to a voltage source 11, which is hooked up to the local power grid with, for example, 380 volts and makes a direct voltage of 60 volts, 120 volts, 200 volts or more available between the positive terminal and the negative terminal. The control means 9 are designed to determine first primary contact surfaces 12 which are in contact with the first secondary contact surface 5 and are designed to determine second primary contact surfaces 13 which are in contact with the second secondary contact surface 6. After determining the first primary contact surfaces 12 and the second primary contact surfaces 13, the control means 9 are designed to establish an electrical connection between the positive terminal of the voltage source 11 and the first primary contact surfaces 12 and to establish an electrical connection between the negative terminal of the voltage source 11 and the second primary contact surfaces 13. An electrical connection is thus hereby established between the positive terminals and the negative terminals of the voltage source 11 and of the charging circuitry 3 in the vehicle, whereupon the charging circuitry transforms the voltage of 60 volts or more supplied to it into the voltage of, for example, 400 volts required in the vehicle.

The secondary transmission element 4 of the contacting system 1 now has a second insulating surface 14 with a width B surrounding the secondary contact surface 6, which has at least one minimum width which corresponds to the diameter D of the circumference around the outer contour of one of the primary contact surfaces 8. It is hereby ensured that none of the second primary contact surfaces 13 connected to the negative terminal can be contacted with a person's finger. To further increase the safety, the second insulating surface 14 may have a width B exceeding the minimum width in order that second primary contact surfaces 13 can also no longer be contacted with, for example, a metallic rod pushed between the primary transmission element 7 and the secondary transmission element 4. The safety is, however, guaranteed in any case as long as the second insulating surface 14 has at least the minimum width. The advantage is hereby obtained that the required safety is guaranteed in spite of the high direct voltage of 60 volts or more with correspondingly high charging currents and thus short charging cycles of the vehicle's battery 2.

One of the primary contact surfaces 8 is shown enlarged in FIG. 2A. The outer contour of the primary contact surface 8 has an extent in a direction X which specifies a direction-dependent minimum width W1 of the second insulating surface. The outer contour of the primary contact surface 8 has an extent in a direction Y which specifies the direction-dependent minimum width W2 of the second insulating surface, which corresponds to the diameter D. According to the first example, the second insulating surface 14 has a width B, wherein B>W1 and B>W2. The advantage is hereby obtained that the secondary transmission element 4 can be lowered in any desired alignment onto the primary transmission element 7 for contacting.

In the contacting system 1 according to the first embodiment of the invention, the second secondary contact surface 6 completely surrounds the first secondary contact surface 5, which is why the first secondary contact surface 5 is also completely surrounded by the second insulating surface 14. It is hereby advantageously also ensured by the second insulating surface 14 that the first secondary contact surface 5 also cannot be contacted with a user's finger.

A particularly advantageous embodiment is provided when the first secondary contact surface 5 is arranged in the centre of the second secondary contact surface 6 and when the second secondary contact surface 6 and the second insulating surface 14 form concentric circles around the first secondary contact surface 5. The first secondary contact surface 5 is particularly well shielded hereby.

It is furthermore particularly advantageous to arrange a first insulating surface 15 as a concentric circle around the first secondary contact surface 5 between the first secondary contact surface 5 and the second secondary contact surface 6, wherein the first insulating surface 15 with the width B likewise has at least the minimum width W2. The electrical insulation of the first secondary contact surface 5 from the second secondary contact surface 6 that is necessary for voltages of 60 volts or more is hereby guaranteed and it is furthermore achieved that the first secondary contact surface 5 is protected particularly well from unwanted touching by people.

It has furthermore proved to be advantageous to form the primary contact surfaces 8 as hexagons. Compared with circular primary contact surfaces known from the state of the art, this makes it possible to form particularly large primary contact surfaces 8 with a large surface area in order to transmit strong charging currents without destroying the contact surfaces 8. Other shapes of primary contact surfaces, such as for example rectangular, octagonal, oval or triangular, would likewise be possible.

The control means 9 are advantageously formed to switch all primary contact surfaces 8 potential-free which have been determined neither as first primary contact surface 12 nor as second primary contact surface 13. It is hereby ensured that all primary contact surfaces 12 and 13 of the primary transmission element 7 that are not necessary for transmitting power in order to charge the vehicle can be touched by a person without electrifications or short circuits of the contacting system 1 possibly resulting.

Figure 4:
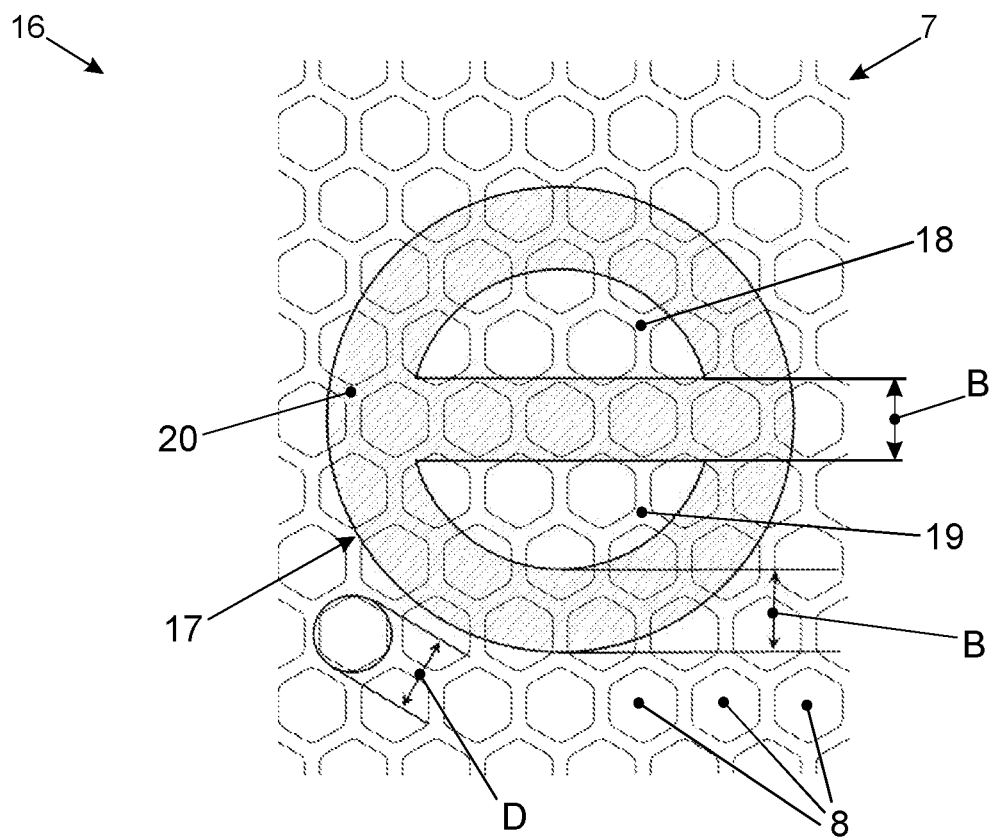
FIG. 4 shows a second embodiment of the contacting system according to the invention, in which a first secondary contact surface and a second secondary contact surface are designed as a segment of a circle and are surrounded by an insulating surface.

FIG. 4 shows a second embodiment of a contacting system 16 according to the invention, wherein only the contact surfaces of a secondary transmission element 17 are formed differently. The secondary transmission element 17 has a first secondary contact surface 18 and a second secondary contact surface 19, which are both designed as a segment of a circle. Both secondary contact surfaces 18 and 19 are surrounded by an insulating surface 20 which forms a first and a second insulating surface. Advantageously, the insulating surface 20 also has a width B between the secondary contact surfaces 18 and 19, corresponding to a first insulating surface, and around the secondary contact surfaces 18 and 19, corresponding to a second insulating surface, which width is greater than the minimum width W2 and the diameter D of the circumference around the outer contour of the primary contact surface 8. In the contacting system 16 according to the second embodiment, the required safety is thus also provided in order to achieve short charging cycles with high direct voltages in the case of direction-independent contacting of the primary transmission element 7 with the secondary transmission element 17.

Figure 5:
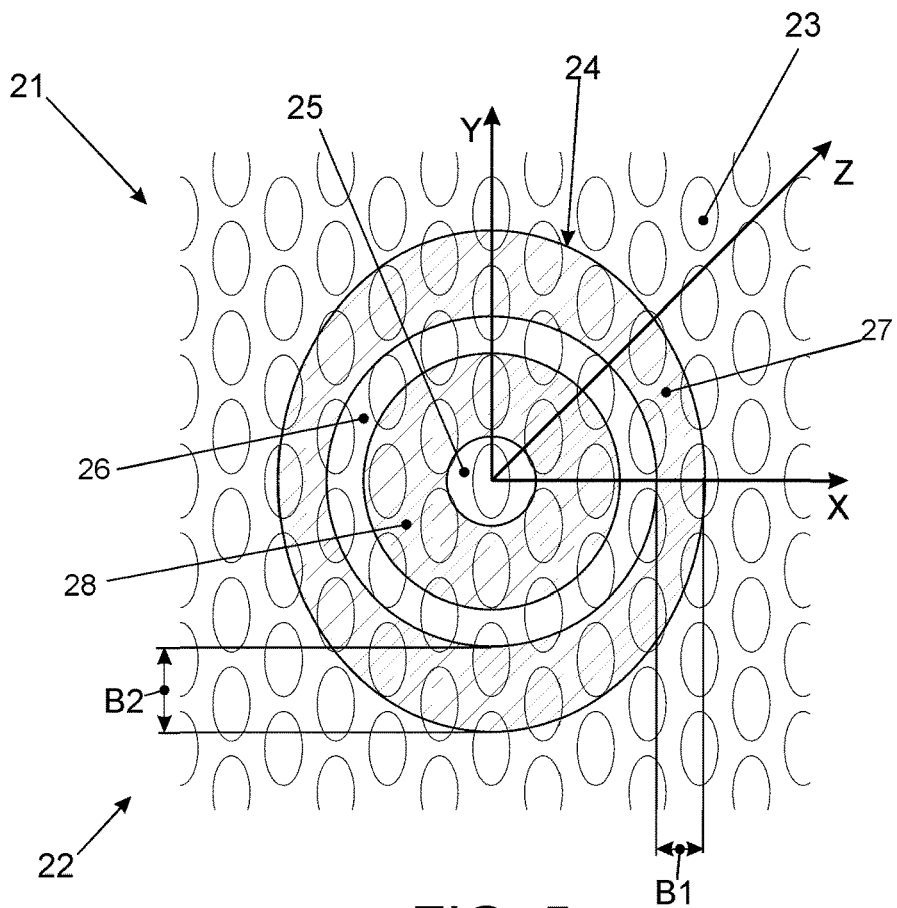
FIG. 5 shows the primary transmission element and the secondary transmission element of a third embodiment of the contacting system according to the invention, in which the outer contour of the primary contact surfaces and the width of the second insulating surface of the secondary transmission element differ in width in a direction-dependent manner.

FIG. 5 shows a primary transmission element 21 according to a third embodiment of a contacting system 22 according to the invention, in which the outer contour of primary contact surfaces 23 is oval and thus direction-dependent. A secondary transmission element 24 has a first secondary contact surface 25 and a second secondary contact surface 26, which are electrically insulated from the outside by a second insulating surface 27 and from each other by a first insulating surface 28. According to the invention, the second insulating surface 27 must, in a direction-dependent manner, have only the minimum width, which is greater than the extent of the contour of the contacted primary contact surface 23 in the same direction.

Figure 6:
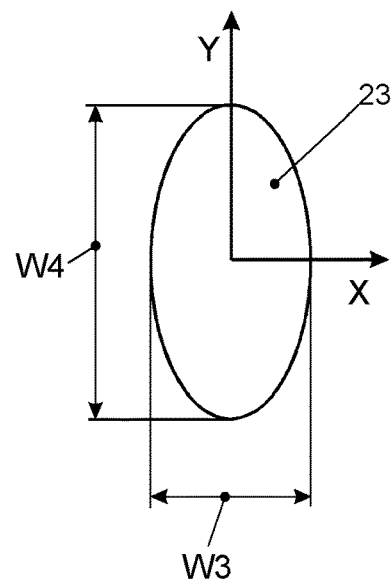
FIG. 6 shows a primary contact surface of the primary transmission element according to FIG. 5 in an enlarged representation.

FIG. 6 shows the primary contact surface 23 of the contacting system 22 in an enlarged representation. In direction X the contour of the primary contact surface 23 has an extent which corresponds to a minimum width W3 in direction X. In direction Y the contour of the primary contact surface 23 has an extent which corresponds to a minimum width W4 in direction Y. In order to form the secondary transmission element 24 particularly narrow, the second insulating surface 27 has a width B1 when primary and secondary contact surfaces are in contact with each other. As the extent of the primary contact surface 23 in direction Y is larger: B2>W4 and B1>W3 applies. In a direction Z inclined by, for example, 45 degrees with respect to the direction X and to the direction Y, the second insulating surface 27 has a width which is greater than the extent of the primary contact surface 23 in the same direction Z. The advantage is hereby obtained that the secondary transmission element 24 can be formed particularly narrow in order to be able to integrate it well into a vehicle.

The contacting system 22 according to the third embodiment of the invention now has positioning means in order to ensure that the secondary transmission element 24 is positioned on the primary transmission element 21 in a direction-dependent manner, i.e. substantially corresponding to the directions X and Y represented in FIGS. 5 and 6. Positioning means may be formed by a sensor, a camera with image recognition or by mechanical means, wherein further possibilities are known to a person skilled in the art. A rough alignment is already provided by the parking space arrangement, which is why positioning means may also be provided by lateral elevations in the road surface to the left and right of the parking space, which ensure that the vehicle can only be parked in this direction.

It can be mentioned that direct voltages of 80, 100 or 400 volts, as well as alternating voltages in similar voltage ranges may also be applied to the contact surfaces of the transmission elements with the second insulating surface. It is also possible to form contact surfaces for more than two terminals with the second insulating surface, with the result that for example three-phase alternating current can be transmitted. Further alternating voltages with different voltage amplitude or frequency could be transmitted via further secondary contact surfaces. Likewise, the transmission of data with respect to, for example, the charge state of the vehicle would be possible via further secondary contact surfaces. The primary transmission means could also be provided on the vehicle, and the secondary transmission means could be provided in the road surface of a parking space. The insulating surface can be formed by a material known to a person skilled in the art, such as plastic or ceramic.

The invention claimed is:

1. A contacting system for establishing a physical electrical connection between a vehicle and a power supply with a first terminal and a second terminal for charging the vehicle, with:
   a primary transmission element which has a plurality of primary contact surfaces arranged in a structured manner, electrically insulated from each other and each having an outer contour, and with
   a secondary transmission element which has at least one first secondary contact surface, for physically contacting the first terminal, and at least one second secondary contact surface, for physically contacting the second terminal, wherein the secondary contact surfaces are electrically insulated from each other, and with control means which are designed to determine first primary contact surfaces which are in direct physical and electrical contact with the first secondary contact surface and which are designed to determine second primary contact surfaces which are in direct physical and electrical contact with the second secondary contact surface, and which are designed to establish an electrical connection via the first primary contact surfaces and the first secondary contact surface, between the first terminal of the power supply and the first terminal of the vehicle, and which are designed to establish an electrical connection via the second primary contact surfaces and the second secondary contact surface for supplying energy to the vehicle, characterized in that a second insulating surface surrounding the secondary contact surfaces is provided, which has at least one optionally direction-dependent minimum width which is greater than an extent of the contour of one of the contacted primary contact surfaces in a same direction (X, Y, Z).

2. The contacting system according to claim 1, characterized in that the second insulating surface has at least one minimum width which is greater than a diameter of a circumference around a largest outer contour of one of the contacted primary contact surfaces.

3. The contacting system according to claim 1, characterized in that the second secondary contact surface completely surrounds the first secondary contact surface and in that the second insulating surface completely surrounds the second secondary contact surface.

4. The contacting system according to claim 3, characterized in that the first secondary contact surface is arranged in a center of the second secondary contact surface and in that the second secondary contact surface and the second insulating surface form concentric circles around the first secondary contact surface.

5. The contacting system according to claim 4, characterized in that a first insulating surface is arranged as a concentric circle around the first secondary contact surface between the first secondary contact surface and the second secondary contact surface, wherein the first insulating surface likewise has at least one, direction-dependent minimum width which is greater than the extent of the contour of one of the contacted primary contact surfaces in the same direction.

6. The contacting system according to claim 1, characterized in that the primary contact surfaces are formed as hexagons.

7. The contacting system according to claim 1, characterized in that the primary contact surfaces are arranged in a shape of a grid.

8. The contacting system according to claim 1, characterized in that there is a voltage of over 60 volts between the first terminal and the second terminal.

9. The contacting system according to claim 1, characterized in that the control means are formed to switch all primary contact surfaces potential-free which have been determined neither as first primary contact surface nor as second primary contact surface by the control means.

10. The contacting system according to claim 1, characterized in that the primary transmission element is provided in a road surface of a parking space and the secondary transmission element is provided in the vehicle such that it can be lowered and lifted for contacting the primary transmission element.

11. The contacting system according to claim 1, characterized in that positioning means are provided for direction-dependent positioning of the secondary transmission element on the primary transmission element and in that the minimum width of the second insulating surface varies depending on the direction.

12. The contacting system according to claim 11, characterized in that the outer contour of the primary contact surfaces is direction-dependent and in that, if secondary contact surfaces are positioned by the positioning means on the primary contact surfaces, the minimum width of the second insulating surface corresponds in a direction-dependent manner at least to the width of the primary contact surface in the same direction (X, Y, Z).

13. The contacting system according to claim 12, characterized in that the outer contour of the primary contact surfaces is oval shaped.

* * * * *